US009544261B2

(12) United States Patent
Archer et al.

(10) Patent No.: US 9,544,261 B2
(45) Date of Patent: Jan. 10, 2017

(54) DATA COMMUNICATIONS IN A DISTRIBUTED COMPUTING ENVIRONMENT

(71) Applicant: International Business Machines Corporation, Armonk, NY (US)

(72) Inventors: Charles J. Archer, Rochester, MN (US); Michael A. Blocksome, Rochester, MN (US); James E. Carey, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 14/011,158

(22) Filed: Aug. 27, 2013

(65) Prior Publication Data

US 2015/0067067 A1    Mar. 5, 2015

(51) Int. Cl.
| | |
|---|---|
| G06F 15/16 | (2006.01) |
| H04L 12/58 | (2006.01) |
| G06F 15/173 | (2006.01) |
| G06F 9/54 | (2006.01) |

(52) U.S. Cl.
CPC ............ H04L 51/26 (2013.01); G06F 9/544 (2013.01); G06F 9/546 (2013.01); G06F 15/17331 (2013.01); H04L 51/34 (2013.01)

(58) Field of Classification Search
CPC .... G06F 9/544; G06F 9/546; G06F 15/17331; H04L 51/26
See application file for complete search history.

(56) References Cited

U.S. PATENT DOCUMENTS

| 6,981,051 B2 | 12/2005 | Eydelman et al. |
| 8,270,299 B2 | 9/2012 | Jia |
| 2005/0132089 A1 | 6/2005 | Bodell |
(Continued)

OTHER PUBLICATIONS

Farreras, M., et al., "Scaling MPI to short-memory MPPs such as BG/L", Proceedings of the 20th Annual International Conference on Supercomputing, Jun. 28-30, 2006, pp. 209-218, ACM, New York, NY, USA, DOI: 10.1145/1183401.1183432.
(Continued)

*Primary Examiner* — Aftab N. Khan
*Assistant Examiner* — Rachel J. Hackenberg
(74) *Attorney, Agent, or Firm* — Brandon C. Kennedy; Feb Cabrasawan; Kennedy Lenart Spraggins LLP

(57) ABSTRACT

Data communications may be carried out in a distributed computing environment that includes a plurality of computers coupled for data communications through communications adapters and an active messaging interface ('AMI'). In such an environment, data communications may include: issuing, by a sender to a receiver, an eager SEND data communications instruction to transfer SEND data, the instruction including information describing a location and size of a send buffer in which the SEND data is stored; transmitting, by the sender to the receiver, the SEND data as eager data packets; issuing, by the receiver to the sender in dependence upon data flow conditions, a STOP instruction, the STOP instruction including an order to stop transmitting the eager data packets; and transferring the SEND data by the receiver from the sender's data location to a receive buffer by remote direct memory access ("RDMA").

14 Claims, 9 Drawing Sheets

(56) References Cited

U.S. PATENT DOCUMENTS

| | | |
|---|---|---|
| 2006/0059257 A1* | 3/2006 | Collard et al. ............... 709/224 |
| 2006/0069788 A1 | 3/2006 | Blackmore et al. |
| 2008/0077916 A1 | 3/2008 | Supalov |
| 2009/0119676 A1 | 5/2009 | Supalov |
| 2009/0129277 A1 | 5/2009 | Supalov |
| 2009/0319701 A1 | 12/2009 | Mehrotra |
| 2010/0122268 A1 | 5/2010 | Jia |
| 2010/0169528 A1* | 7/2010 | Kumar ................. G06F 13/385 710/263 |
| 2011/0067030 A1 | 3/2011 | Isard |
| 2012/0072607 A1 | 3/2012 | Kawashima |
| 2012/0117211 A1 | 5/2012 | Blocksome et al. |
| 2012/0137294 A1 | 5/2012 | Archer et al. |
| 2015/0063100 A1 | 3/2015 | Archer et al. |
| 2015/0067068 A1 | 3/2015 | Archer et al. |

OTHER PUBLICATIONS

Abts, D., et al., "High Performance Datacenter Networks: Architectures, Algorithms, and Opportunities", Mar. 2011, pp. 1-115, Morgan & Claypool, San Rafael, California, URL: http://dx.doi.org/10.2200/S00341ED1V01Y201103CAC014.

* cited by examiner

DATA COMMUNICATIONS IN A DISTRIBUTED COMPUTING ENVIRONMENT

BACKGROUND OF THE INVENTION

Field of the Invention

The field of the invention is data processing, or, more specifically, methods, apparatus, and products for data communications in a distributed computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Data communications is an area of computer technology that has experienced advances, and modes of data communications today effectively implement distributed computing environments. In the 1990s, a consortium that included Apollo Computer (later part of Hewlett-Packard), IBM, Digital Equipment Corporation, and others developed a software system that was named 'Distributed Computing Environment.' That software system is mentioned here for the sake of clarity to explain that the term 'distributed computing environment' as used in this specification does not refer that software product from the 1990s. As the term is used here, 'distributed computing environment' refers to any aggregation of computers or compute nodes coupled for data communications through a system-level messaging layer in their communications protocol stacks, where the system-level messaging layer provides 'active' messaging, messaging with callback functions. Implementations of such system-level messaging include messaging layers in client-server architectures, messaging layers in Symmetric Multi-Processing ('SMP') architectures with Non-Uniform Memory Access ('NUMA'), and messaging layers in parallel computers, including Beowulf clusters and even supercomputers with many compute node coupled for data communications through such system-level messaging. Common implementations of system-level messaging for parallel processing include the well known Message Passing Interface ('MPI') and the Parallel Virtual Machine ('PVM'). Both of these permit the programmer to divide a task among a group of networked computers, and collect the results of processing. Examples of MPI implementations include OpenMPI and MPICH. These and others represent examples of implementations of system-level messaging that can be improved for data communications in a distributed computing environment according to embodiments of the present invention.

Parallel computing is another area of computer technology that has experienced advances. Parallel computing is the simultaneous execution of the same application (split up and specially adapted) on multiple processors in order to obtain results faster. Parallel computing is based on the fact that the process of solving a problem often can be divided into smaller jobs, which may be carried out simultaneously with some coordination. Parallel computing expands the demands on middleware messaging beyond that of other architectures because parallel computing includes collective operations, operations that are defined only across multiple compute nodes in a parallel computer, operations that require, particularly in supercomputers, massive messaging at very high speeds. Examples of such collective operations include BROADCAST, SCATTER, GATHER, AND REDUCE operations.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

At the same time, the network link speed and number of links into and out of a compute node are dramatically increasing. IBM's BlueGene/Q™ supercomputer, for example, will have a five-dimensional torus network, which implements ten bidirectional data communications links per compute node—and BlueGene/Q will support many thousands of compute nodes. To keep these links filled with data, DMA engines are employed, but increasingly, the HPC community is interested in latency. In traditional supercomputers with pared-down operating systems, there is little or no multi-tasking within compute nodes. When a data communications link is unavailable, a task typically blocks or 'spins' on a data transmission, in effect, idling a processor until a data transmission resource becomes available. In the trend for more powerful individual processors, such blocking or spinning has a bad effect on latency.

Of course if an application blocks or 'spins' on a data communications program, then the application is advised immediately when the transfer of data pursuant to the instruction is completed, because the application cease further processing until the instruction is completed. But that benefit comes at the cost of the block or the spin during a period of time when a high performance application could have otherwise been performing other functions. There is therefore a trend in the technology of large scale messaging toward attenuating this need to spin on a data communications resource waiting for completion of a data transfer. In some of these trends, a particular data communications protocol is selected for each data communications transmission based on a variety of factors including, for example, total message size. Some examples of such data communications protocols include an eager protocol and a rendezvous protocol, both of which are described below in greater detail. In most embodiments, the sender or origin of the data transmission selects the protocol to utilize for the data communications transmission, but does so without full knowledge of the receiver's (or target's) readiness to accept such a transmission. At times, then, the sender's selection of the protocol actually results in a less efficient means of data transmission.

SUMMARY OF THE INVENTION

Methods, apparatus, and computer program products are described for data communications in a distributed computing environment. The distributed computing environment includes a plurality of computers coupled for data communications through communications adapters and an active messaging interface ('AMI'). Data communications in such a distributed computing environment according to embodiments of the present invention may include: issuing, by a sender to a receiver, an eager SEND data communications instruction to transfer SEND data, the instruction including information describing a location and size of a send buffer in which the SEND data is stored; transmitting, by the sender to the receiver, the SEND data as eager data packets; issuing, by the receiver to the sender in dependence upon data flow conditions, a STOP instruction, the STOP instruction including an order to stop transmitting the eager data packets; and transferring the SEND data by the receiver from the sender's data location to a receive buffer by remote direct memory access ("RDMA").

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
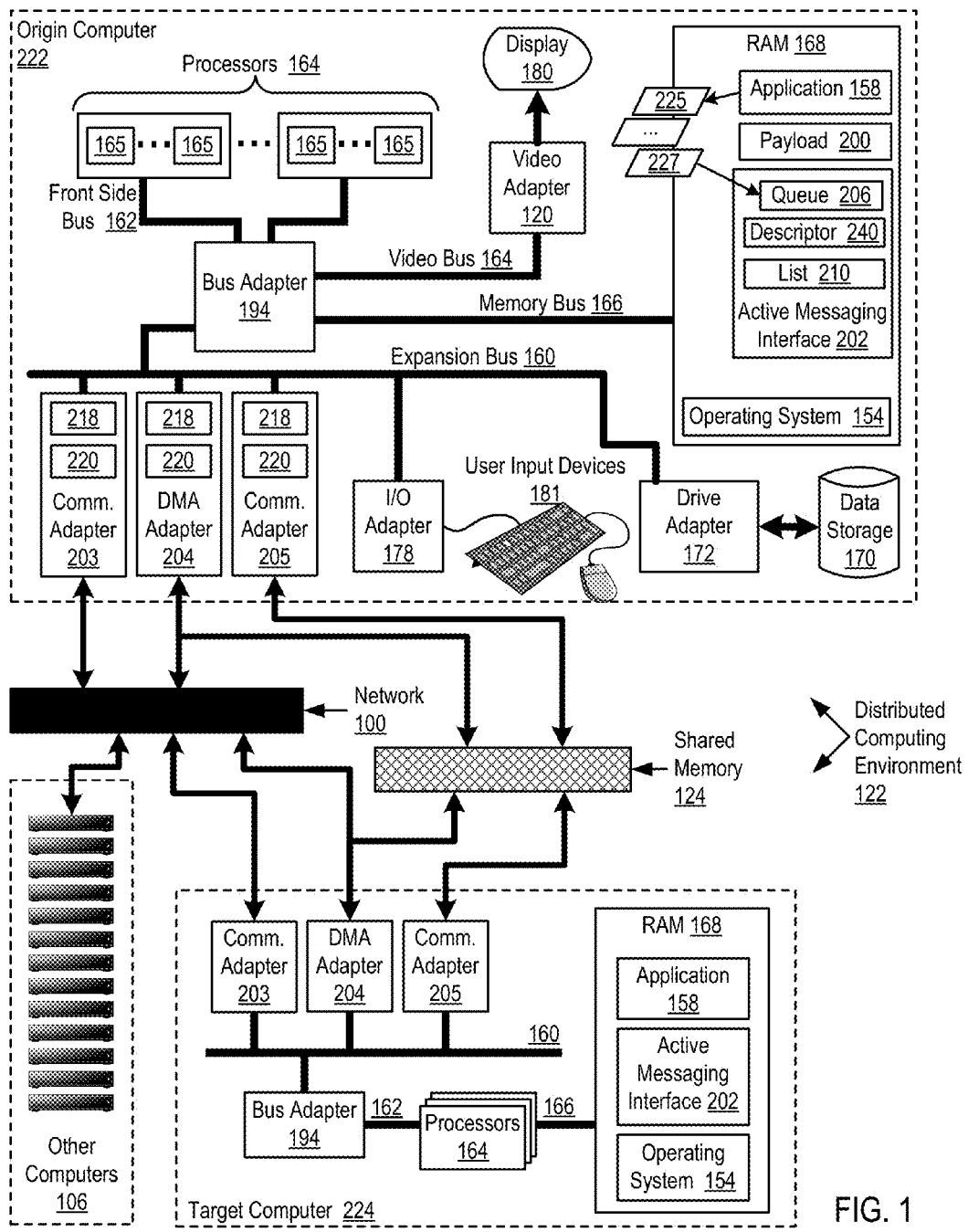
FIG. 1 sets forth a functional block diagram of an example distributed computing environment that implements data communications according to embodiments of the present invention.

Example methods, apparatus, and products for data communications in a distributed computing environment according to embodiments of the present invention are described with reference to the accompanying drawings, beginning with FIG. 1. FIG. 1 sets forth a functional block diagram of an example distributed computing environment (122) that implements data communications according to embodiments of the present invention. The distributed computing environment (122) of FIG. 1 includes several computers, an origin computer (222), a target computer (224), and other computers (106), all of which are coupled for data communications through communications adapters (203, 204, 205) and an active messaging interface ('AMI') (202). For ease of illustration, only the origin computer (222) and the target computer (224) are illustrated in detail with the communications adapters (203, 204, 205) and the AMI (202), but the other computers (106) also are so equipped. From time to time in this specification, an origin compute node may also be referred to as a 'sender' and a target compute node may also be referred to as a 'receiver.'

The origin and target computers (222, 224) in the example of FIG. 1 include one or more computer processors (164) or 'CPUs' as well as random access memory (168) ('RAM'). Each processor (164) can support multiple hardware compute cores (165), and each such core can in turn support multiple threads of execution, hardware threads of execution as well as software threads. Each processor (164) is connected to RAM (168) through a high-speed memory bus (166)—and through a high-speed front side bus (162), a bus adapter (194), and an expansion bus (160) to other components of the computer. Stored in RAM (168) is an application program (158), a module of computer program instructions that carries out user-level data processing using linear, SMP, or parallel algorithms that include data communications among the computers in the distributed computing environment, including issuing data communications instructions to the AMI (202).

Also shown stored in RAM (168) is the AMI (202) itself, a module of automated computing machinery that carries out data communications in a distributed computing environment according to embodiments of the present invention. An AMI (202) can be developed from scratch to carry out data communications in a distributed computing environment according to embodiments of the present invention, using a traditional programming language such as the C programming language or C++, for example, and using traditional programming methods to write communications routines that send and receive data among computers in the distributed computing environment through data communications networks or shared-memory transfers. Such an AMI developed from scratch can expose to applications an entirely new application programming interface ('API'). As an alternative to an AMI developed from scratch, an AMI (202) can expose a traditional API, such as MPI's API, to the application (158) so that the application can gain the benefits of an AMI with no need to recode the application. As an alternative to development from scratch, however, existing prior art system-level messaging modules may be improved to carry out data communications in a distributed computing environment according to embodiments of the present invention, existing modules that already implement a traditional interface. Examples of prior-art system-level messaging modules that can be improved to implement data communications in a distributed computing environment according to embodiments of the present invention include such parallel communications libraries as the traditional 'Message Passing Interface' ('MPI') library, the 'Parallel Virtual Machine' ('PVM') library, MPICH, and the like. In the example of FIG. 1, the AMI (202) is represented in RAM (168). Readers will recognize, however, that the representation of the AMI in RAM is a convention for ease of explanation rather than a limitation of the present invention, because the AMI in fact can be implemented partly as software or firmware and hardware—or even, at least in some embodiments, entirely in hardware.

Also stored in RAM (168) is an operating system (154). An operating system is a computer software component that is responsible for execution of applications programs and for administration of access to computer resources, memory, processor time, and I/O functions, on behalf of application programs. Operating systems useful for data communications in a distributed computing environment according to embodiments of the present invention include UNIX™, Linux™, Microsoft XP™, AIX™, IBM's i5/OS™, and others as will occur to those of skill in the art. The application (168), the AMI (202), and the operating system (154) in the example of FIG. 1 are shown in RAM (168), but many components of such data processing modules typically are stored in non-volatile memory also, such as, for example, on a disk drive (170).

The origin computer (222) of FIG. 1 includes disk drive adapter (172) coupled through expansion bus (160) and bus adapter (194) to the processor (164) and other components of the computer (222). Disk drive adapter (172) connects non-volatile data storage to the computer (222) in the form of disk drive (170). Disk drive adapters useful in computers for data communications in a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example origin computer (222) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (222) of FIG. 1 includes a video adapter (120), which is an example of an I/O adapter specially designed for graphic output to a display device (180) such as a display screen or computer monitor. Video adapter (120) is connected to processors (164) through a high speed video bus (164), bus adapter (194), and the front side bus (162), which is also a high speed bus.

The example target and origin computers (222, 224) of FIG. 1 include communications adapters (203, 204, 205) for data communications with other computers through a data communications network (100) or a segment of shared memory (124). Such data communications may be carried out serially through RS-232 connections, through external buses such as a Universal Serial Bus (USW), through data communications data communications networks such as Internet Protocol ('IP') data communications networks, and in other ways as will occur to those of skill in the art. Communications adapters implement the hardware level of data communications through which one computer sends data communications to another computer, directly, through shared memory, or through a data communications network. Examples of communications adapters useful for data communications in a distributed computing environment according to embodiments of the present invention include modems for wired dial-up communications, Ethernet (IEEE 802.3) adapters for wired data communications network communications, and 802.11 adapters for wireless data communications network communications. In the particular example of FIG. 1, communications adapters (203, 204, 205) adapt computers for communications through a network (100). Examples of networks useful for data communications in a distributed computing environment according to embodiments of the present invention include Infiniband™, Gigabit Ethernet™, Fibre Channel™, PCI Express™, Serial ATA™, and others.

The communications adapters in the example of FIG. 1 include direct memory access ('DMA') adapters (204), modules of automated computing machinery that implement, through communications with other DMA adapters on other computers direct memory access to and from memory on its own computer as well as memory on other computers. Direct memory access is a way of reading and writing to and from memory among computers with reduced operational burden on computer processors (164); a CPU initiates a DMA transfer, but the CPU does not execute the DMA transfer. A DMA transfer essentially copies a block of memory from one computer to another, or between RAM segments of applications on the same computer, from an origin to a target for a PUT operation, from a target to an origin for a GET operation, for example.

Also in the example of FIG. 1, communications adapters (205) adapt computers for communications through a segment of shared memory (124). In the example of FIG. 1, each processor or compute core has uniform access to the RAM (168) on the same computer, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory (124) can be configured locally for one endpoint and remotely for another endpoint—or remotely from both endpoints of a communication. In an embodiment, the origin computer (222) and the target computer (224) are both compute cores on the same compute node in a parallel computer, and, in that circumstance at least, a segment of shared memory (124) can be local to both the origin computer (222) and the target computer (224). From the perspective of an origin computer transmitting data through a segment of shared memory that is configured remotely with respect to the origin endpoint, transmitting data through the segment of shared memory will appear slower that if the segment of shared memory were configured locally with respect to the origin—or if the segment were local to both the origin and the target. The shared memory communications adapter (205) presents a similar interface to the AMI (202) as do the other adapters (203, 204), including availability of an injection FIFO buffer (218). In embodiments where communications through a shared memory segment is available, however, it will often be faster than other methods.

The origin computer (222) and the target computer (224) are so labeled in this example because the origin computer is described as executing data communications instructions and therefore originating data transfers and the target computer is described as a subject of data communications instructions. The origin/target distinction does not describe the direction of data flow. A DMA PUT instruction transfers data from the origin computer to the target computer; a DMA GET instruction transfers data in the opposite direction from the target to the origin. In addition, the description here of only one target and one origin is not a limitation. In processing collective BROADCAST as a data communications instruction, a root process on an origin computer can transfer data to a large plurality of targets, including, for example, all of the computers (222, 224, 106) in the distributed computing environment—including treating itself as one of the targets. Similarly, in a collective GATHER, origin processes on all the computers in the distributed computing environment can transfer data to a single root process on one origin computer. In client/server, SMP, peer-to-peer, and other architectures, multiple origin computers send and receive message data among multiple target computers through an AMI.

The origin computer (222) in the example of FIG. 1 functions generally to carry out data communications in a distributed computing environment by receiving in the AMI (202) from an application (158) a sequence (225 . . . 227) of data communications instructions. In an embodiment, the application calls a function in an API that is exposed by the AMI to insert or post the instructions into an instruction queue in the AMI. In this way, the application's call to the API function is non-blocking That is, the application is not required to block, spin, or otherwise wait for completion of the processing of the data communications instructions. The application inserts or posts an instruction into the queue, continues with other processing, and is informed of instruction completion by the AMI through a done callback.

Each instruction specifies a transfer of payload data (200) among computers in the distributed computing environment, and at least one of the instructions specifies a callback function. Examples of data communications instructions amendable to, or that can be improved to work with, data communications according to embodiments of the present invention include the following, as well as others that will occur to those of skill in the art:
  rendezvous network-based SEND instructions in which both origin and target endpoints communicate and participate in a data transfer, good for longer messages, typically composed of handshakes transferring header information followed by packet switched messaging or DMA operations to transfer payload data,
  eager network-based SEND instructions in which only the origin or root computer conducts a data transfer, merely informing the target that the transfer has occurred, and requiring no communications or other participation from the target,
  rendezvous SEND instructions with operations conducted, not through a network, but through shared memory, in which both the origin and target communicate and participate in a data transfer,
  eager SEND instructions conducted, not through a network, but through shared memory, in which only the origin or root conducts a data transfer, merely informing targets that the transfer has occurred, but requiring no communications or other participation from the targets,
  network-based DMA PUT instructions, useful for fast transfers of small messages, sometimes containing header data and payload data in a single transfer or packet—DMA algorithms also can be used as components of other instructions—as for example a SEND instruction that does an origin-target handshake and then conducts payload transfers with PUTs,
  DMA PUT instructions with transfers through shared memory, again useful for fast transfers of small messages, sometimes containing header data and payload data in a single transfer or packet—DMA instructions also can be used as components of other algorithms—as for example a SEND instruction that does an origin-target handshake through a segment of shared memory and then conducts payload transfers with PUTs,
  data communications instructions based on DMA GET operations, either networked or through shared memory, and
  data communications instructions that include eager or rendezvous RECEIVE operations, either with send-side matching of SENDs or with receive-side matching.

The term 'payload' distinguishes header data and the like in data communications. The payload data (200) is specified typically with a buffer memory address and a quantity. The location and quantity of payload data as well as any callback functions are provided by the application (158) as parameters of the data communications instructions (225 . . . 227). A 'callback function' is often referred to in this specification simply as a 'callback.' Callback functions include dispatch callbacks as well as done callbacks. A dispatch callback is a function to be called upon receipt of a data communications instruction. A done callback is a function to be called upon completion of the transfer of payload data as specified by a data communications instruction. Except as otherwise stated in context, discussion and description of a callback in this specification is a description of a done callback, so that the term 'callback' and 'done callback' are generally synonyms, unless otherwise stated.

The origin computer (222) in the example of FIG. 1 also injects, by the AMI (202) for each data communications instruction (225 . . . 227) into a slot in an injection FIFO buffer (218) of a data communication adapter (203, 204, 205), a transfer descriptor (240). The transfer descriptor specifies to the communications adapter the transfer of payload data, and the slot in the injection FIFO buffer (218) has a corresponding slot in a pending callback list (210). The term 'injection' connotes the 'injection' of transfer data into a data communications resource, a network, a shared memory, and the like, for actual transport to a target. A transfer descriptor provides a description of a data communications instruction that is recognizable or administrable by lower level data communications resources, including communications adapters, DMA adapters, and the like. The origin computer (222) also lists, through the AMI (202) in the corresponding slot in the pending callback list (210) for each data communications instruction, any callback function specified by that instruction and increments a pending callback counter (216) for each listed callback function.

The communications adapter (here, one of 203, 204, 205) that received the transfer descriptor transfers payload data in accordance with each transfer descriptor in its injection FIFO buffer (218) and increments a transfer counter (220) upon completion of each transfer. The origin computer (222) through its AMI also determines from counter values (216, 220) whether the pending callback list (210) presently includes callback functions for which transfers of payload data have been completed and calls through its AMI any callback functions in the pending callback list (210) for which transfers of payload data have been completed, decrementing the pending callback counter (216) for each callback function called.

The description set forth above regarding data communications describes lower-level or underlying steps that effect such data communications. The computers in the example of FIG. 1 may also be configured to carry out data communications with one or more protocols. For example, a sender such as the origin computer (222) of FIG. 1, may be configured to issue, to a receiver (224), an eager SEND data communications instruction to transfer SEND data. The SEND instruction may be issued by the application as call to the AMI (202) as described above and may be processed through the AMI, data communications adapters (203, 204, 205) an the network (100) as described above. The SEND instruction may include information describing data location at the sender and data size.

The sender (222) may also transmit, to the receiver (224), the SEND data as eager data packets. The sender (222) may transmit such packets through any one of the communications adapter (203 or 205).

The receiver (224) may be configured to issue, to the sender, a STOP instruction. The STOP instruction may be an order to stop transmitting the eager data packets. Data flow conditions may refer to any condition that affects data flow including, for example: availability in the receiver of a RECEIVE instruction corresponding to the eager SEND instruction where the RECEIVE instruction including the memory location of a receive buffer; availability of temporary buffer space for the eager data packets at one or more of the receiver's adapters; present network bandwidth utilization; processor utilization; and so on.

The receiver (224) may also be configured to transfer the SEND data from the sender's data location to a receive buffer by remote direct memory access ("RDMA"). Various examples of receiver transferring the SEND data from the sender's data location to a receiver buffer by RDMA (such as one or more DMA GET operations) are set forth below.

The arrangement of computers, communications adapters, and other devices making up the example distributed computing environment illustrated in FIG. 1 are for explanation, not for limitation. Data processing systems useful for data communications in a distributed computing environment according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
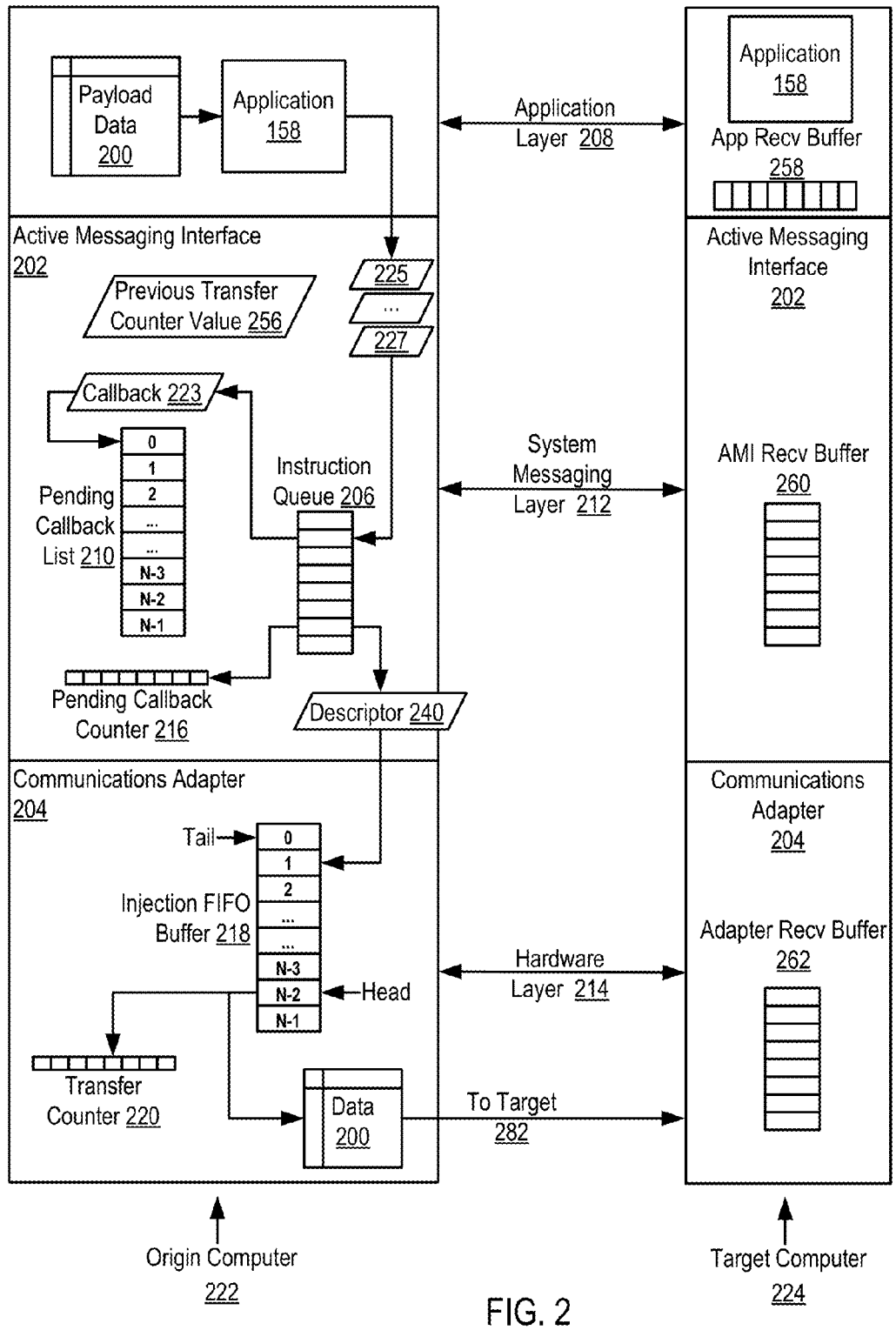
FIG. 2 sets forth a block diagram of an example protocol stack useful in apparatus that implements data communications instructions according to embodiments of the present invention.

For further explanation, FIG. 2 sets forth a block diagram of an example protocol stack useful in apparatus that implements data communications in a distributed computing environment according to embodiments of the present invention. The example protocol stack of FIG. 2 includes a hardware layer (214), a system messaging layer (212), and an application layer (208). For ease of explanation, the protocol layers in the example stack of FIG. 2 are shown connecting an origin computer (222) and a target computer (224), although it is worthwhile to point out that in embodiments, the origin computer and the target computer can be the same computer, because any particular transfer can be from an origin application on a computer to a target application on the same computer. This pattern would be very common, for example, in a supercomputer whose compute nodes operate multi-threaded. Every thread of execution on such a computer can function as both an origin or a target for data transfers through an AMI, and both the origin and its target can be located on the same computer. So an origin computer (222) and its target computer (224) can in fact, and often will, be the same computer.

The application layer (208) provides communications among applications (158) running on the computers (222, 224) by invoking functions in an Active Messaging Interface ('AMI') (202) installed on each computer. Applications may communicate messages by invoking functions of an application programming interface ('API') exposed by the AMI (202). The AMI can expose a novel, custom API, or the AMI can expose a traditional API, such as, for example, an API of an MPI library, to applications (158) so that the application can gain the benefits of an AMI, reduced network traffic, callback functions, and so on, with little or no need to recode the application.

The example protocol stack of FIG. 2 includes a system messaging layer (212) implemented here as an Active Messaging Interface or 'AMI' (202). The AMI provides system-level data communications functions that support messaging in the application layer (208) and the system messaging layer (212). Such system-level functions are typically invoked through an API exposed to the application (158) in the application layer (208).

The protocol stack of FIG. 2 includes a hardware layer (214) that defines the physical implementation and the electrical implementation of aspects of the hardware on the computers such as the bus, network cabling, connector types, physical data rates, data transmission encoding and many other factors for communications between the computers (222, 224) on the physical network medium. In computers that implement data communications in a distributed computing environment according to embodiments of the present invention, the hardware layer includes communications adapters, including DMA adapters, and network links, including routers, packet switches, and the like. In this particular example, the hardware layer (214) in each computer includes a communication adapter (204).

The origin computer (222) in the example of FIG. 2 functions generally to carry out data communications in a distributed computing environment by receiving in the AMI (202) from an application (158) a sequence (225 . . . 227) of data communications instructions. In an embodiment, the application (158) calls a function in an API that is exposed by the AMI to insert or post the instructions into an instruction queue (206) in the AMI. In this way, the application's call to the API function is non-blocking. The application (158) does not block or spin on the post to the instruction queue. Instead, the application inserts or posts an instruction into the queue (206), continues with other processing, and is eventually informed of instruction completion by the AMI through a done callback. Each instruction (225 . . . 227) specifies a transfer of payload data (200) among computers in a distributed computing environment, and some of the data communications instructions specify callback functions (223).

The origin computer (222) in the example of FIG. 2 also injects, by the AMI (202) for each data communications instruction (225 . . . 227) into a slot in an injection FIFO buffer (218) of a data communication adapter (204), a transfer descriptor (240).

'FIFO' is an abbreviation of 'first-in-first-out' and connotes the fact that the communications adapter (204) processes its descriptors in the order in which they are placed in the injection FIFO buffer (218). The transfer descriptor (240) specifies to the communications adapter (204) the transfer of payload data, and the slot in the injection FIFO buffer (218) has a corresponding slot in a pending callback list (210). Both the injection FIFO buffer (218) and the pending callback list (210) are apportioned into N slots, here labeled 0 . . . N−1. The slots 'correspond' in that:
  any pending callback for the transfer descriptor in slot 0 of the injection FIFO buffer (218) is found in slot 0 of the pending callback list (210)
  any pending callback for the transfer descriptor in slot 1 of the injection FIFO buffer (218) is found in slot 1 of the pending callback list (210)
  any pending callback for the transfer descriptor in slot N−2 of the injection FIFO buffer (218) is found in slot N−2 of the pending callback list (210), and
  any pending callback for the transfer descriptor in slot N−1 of the injection FIFO buffer (218) is found in slot N−1 of the pending callback list (210).

The term 'pending' as used here indicates that a callback has been listed but its corresponding data transfer has not yet been completed. Each done callback is called only after completion of its corresponding data transfer, the transfer represented by a transfer descriptor in a corresponding slot in the injection FIFO buffer.

The communications adapter (204) transfers payload data (200) in accordance with each transfer descriptor (240) in its injection FIFO buffer (218) and increments a transfer counter (220) upon completion of each transfer through its AMI any callback functions in the pending callback list (210) for which transfers of payload data have been completed as it does so.

Also depicted in the example of FIG. 2 is an adapter receive buffer (262) at the target computer (224), an AMI receive buffer (260) allocated in AMI memory space of the target computer (224), and an application receive buffer (258) in application memory space of the target computer (224). From time to time, any one or more of these receive buffers may be full or not yet allocated. In such an embodiment, the target computer (224) may receive, from the origin computer (222), an eager SEND data communications instruction to transfer SEND data to the target computer (224), where the instruction includes information describing data location at the sender and data size. Then, the target computer (224) may receive the SEND data as eager data packets. Depending upon the state of the receive buffers, may issue, to the sender, a STOP instruction including an order to stop transmitting the eager data packets and transfer the SEND data from the sender's data location to a receive buffer by RDMA.

Figure 3:
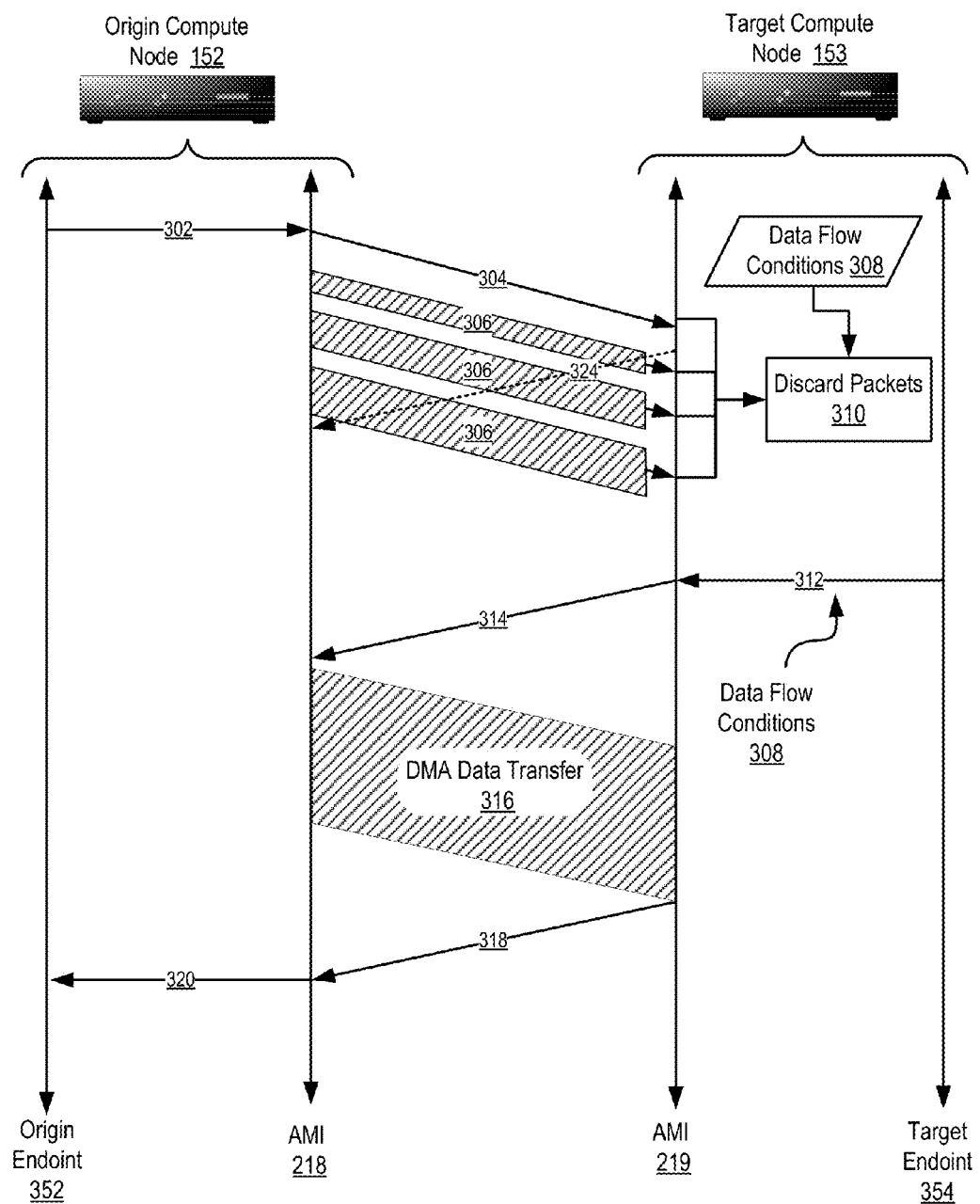
FIG. 3 sets forth a calling sequence diagram illustrating an example method of data communications in a distributed computing environment according to embodiments of the present invention.

For further explanation, FIG. 3 sets forth a calling sequence diagram illustrating an example method of data communications in a distributed computing environment according to embodiments of the present invention. The distributed computing environment in the example of FIG. 3 may be similar to that described above with respect to FIG. 1. More specifically, the example distributed computing environment of FIG. 3 includes an origin compute node (152) which is referred to here as a 'sender.' The example distributed computing environment of FIG. 3 also includes a target compute node (153) which is referred to here as a 'receiver.'

The example sender (152) of FIG. 3 includes an origin endpoint (352), an application-level module of computer program instructions that, among other operations, is configured to call AMI functions to effect data communications between the sender (152) and the receiver (153). The sender (152) also includes an AMI (218). In a similar manner, the example receiver (153), includes an target endpoint (354) configured to receive data communications from the origin compute node (152) via an AMI (219) at the receiver (153). Not shown here, are communication adapters that may operate in a manner similar to those shown in FIG. 1 and FIG. 2.

The sender (152) in the example of FIG. 3 issues, to a receiver, an eager SEND data communications instruction (304) to transfer SEND data. The sender (152) issues the eager SEND data communications instruction (304) as a result of the origin endpoint (352) makes a SEND call into the AMI (218). The AMI (218), responsive to the SEND call, issues the SEND instruction (304) to the AMI (219) of the receiver (153). The instruction may include information describing data location at the sender and data size of the SEND data.

The sender (152) in the example of FIG. 3 then transmits, to the receiver, the SEND data as eager data packets (306). In the example of FIG. 3, the sender (152) transmits multiple eager data packets (306) increasing in size.

In the example of FIG. 3, the receiver (153) issues, to the sender in dependence upon data flow conditions (308), a STOP instruction (324). The STOP instruction includes an order to stop transmitting the eager data packets. The sender ceases transmitting eager data packets upon receipt of the STOP instruction (324).

Also in the example of FIG. 3, the receiver (153) discards (310) eager data packets (306) transmitted by the sender before the sender received the STOP instruction (324), also in dependence upon data flow conditions (308).

Also in the example of FIG. 3, the receiver (153) may transfer the SEND data from the sender's data location to a receive buffer by RDMA (316). In the example of FIG. 3, the data flow conditions (308) causing the receiver (153) to transfer the SEND data by RDMA (316) includes the target endpoint (354) making a call to a RECEIVE function in the AMI (219). The call is an example of a RECEIVE instruction that corresponds to the SEND instruction and includes a memory location of a receive buffer.

The RDMA in the example of FIG. 3 is a remote GET operation (314) and, upon completion of the data transfer (316), the receiver sends an acknowledgement (318) advising the sender (152) of the completed data transfer. The AMI (218) of the sender (152) receives the acknowledgement (318) and issues a return (320) to the origin endpoint's RECEIVE instruction (or 'RECEIVE function call') advising the origin endpoint (352) that the data transmission is complete.

Figure 4:
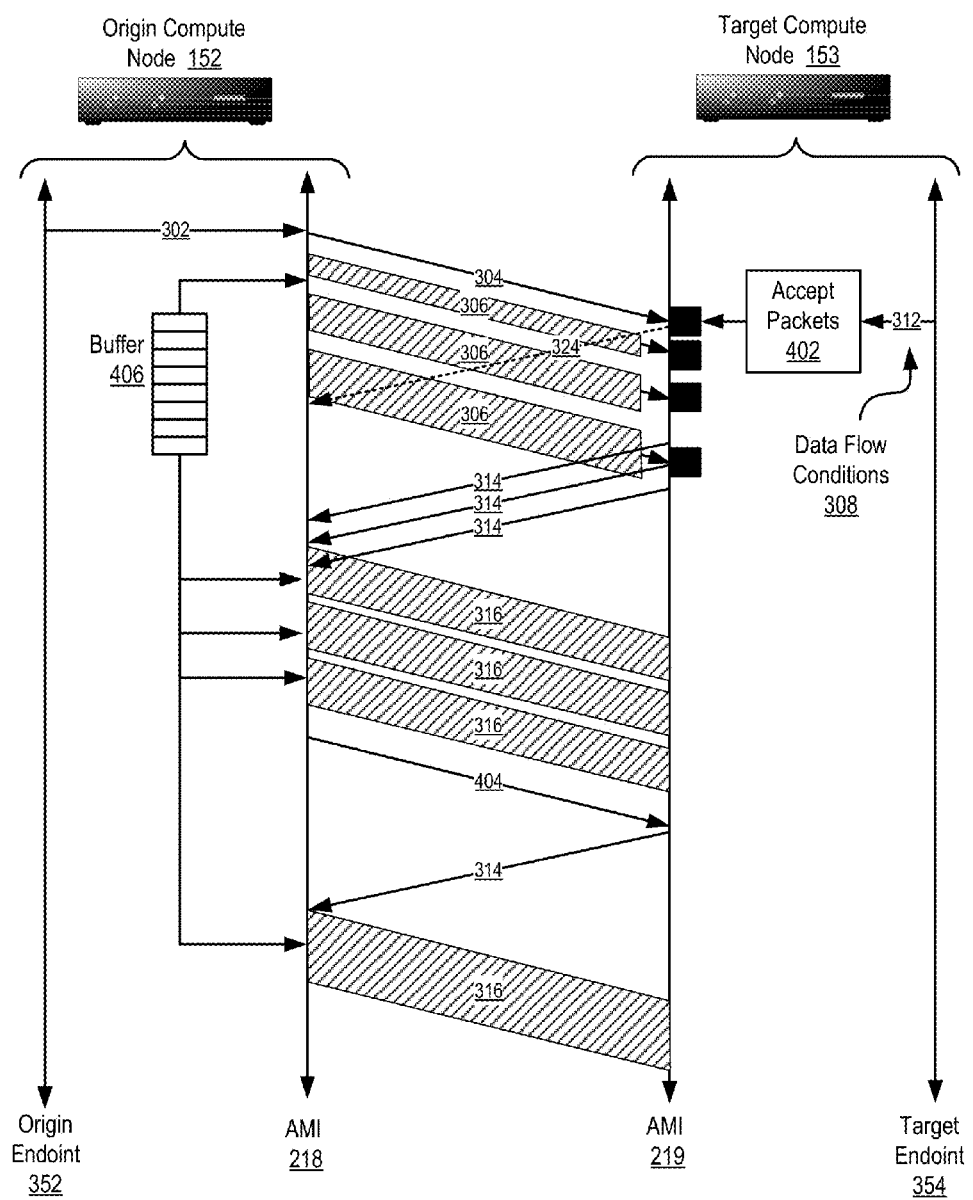
FIG. 4 sets forth a calling sequence diagram illustrating another example method of data communications in a distributed computing environment according to embodiments of the present invention.

For further explanation, FIG. 4 sets forth a calling sequence diagram illustrating another example method of data communications in a distributed computing environment according to embodiments of the present invention. The calling sequence diagram of FIG. 4 is similar to that of FIG. 3 in that the diagram of FIG. 4 depicts a similar distributed computing environment with a sender (152), receiver (153), AMIs (218, 219), and endpoints (352, 354). The example diagram of FIG. 4 is also similar to that of FIG. 3 in that the diagram of FIG. 4 includes: the sender (152) issuing, to the receiver (153), an eager SEND data communications instruction (304) to transfer SEND data; the sender (152) transmitting, to the receiver, the SEND data as eager data packets (306); the receiver (153) issuing a STOP instruction (324) to the sender (152); and the receiver (153) transferring SEND data by RDMA (316).

The diagram of FIG. 4 differs from that of FIG. 3, however, in that the receiver (153) transmits the SEND data, beginning from the top of the send buffer (406), as multiple eager send packets (306) increasing in size. The term 'top' refers to one end of a buffer, especially when implemented as a FIFO buffer, and the term 'bottom' refers to the opposite end of the buffer.

Also in the example diagram of FIG. 4, the receiver (153) initially accepts the eager data packets (306) transmitted from the sender before the sender receives the STOP instruction. At nearly the same time the receiver sends the STOP instruction, the sender also issues several RDMA get (314) instructions to transfer the SEND data beginning from the bottom of the send buffer (406) by RDMA. In some embodiments, then, the receiver is issued a SEND instruction, sends a STOP instruction nearly immediately and begins to accept eager data packets sent by the sender prior to the sender receiving and processing the STOP instruction. Those eager data packets include payload from the top portion of the buffer. While receiving those eager data packets, the receiver begins to transfer data, in increasing quantity or in predefined quantities, in one or more RDMA operations from the bottom of the buffer. The sender, then, sends data from the top while the receiver begins transferring data from the bottom of the receive buffer.

Then, in the example of FIG. 4, the sender transmits to the receiver a clear-to-send ('CTS') message (404) advising the receiver of the quantity of eager SEND data transmitted before the sender received the STOP instruction. In this way, the receiver knows both the quantity of data transferred from the bottom of the buffer (406) and the quantity of data from the top of the buffer received as eager data packets (306). The receiver (153) in the example of FIG. 4, transfers the untransmitted SEND data from the send buffer via RDMA (316) with one or more DMA GET operations (314). That is, the receiver transfers only that portion of the buffer not previously transferred from the bottom of the buffer nor that portion of the top of the buffer received in data eager packets.

In such an embodiment, transferring the SEND data may be carried out by the receiver (153) transferring the SEND data of the discarded packets from the sender's data location to a receive buffer by RDMA (316). Upon completion, the receiver (153) may send an acknowledgement (318) to the AMI (218) of the sender (152) advising the sender (152) of completion. The AMI (218) may then provide a return to the origin endpoint's (352) SEND instruction (302) advising the origin endpoint of data transmission completion.

Although not shown in the example of FIG. 4, upon completion of the final data transfer (316), the receiver may send an acknowledgement advising the sender (152) of the completed data transfer. The AMI (218) of the sender (152) may receives the acknowledgement and issue a return to the origin endpoint's RECEIVE instruction (or 'RECEIVE function call') advising the origin endpoint (352) that the data transmission is complete.

Figure 5:
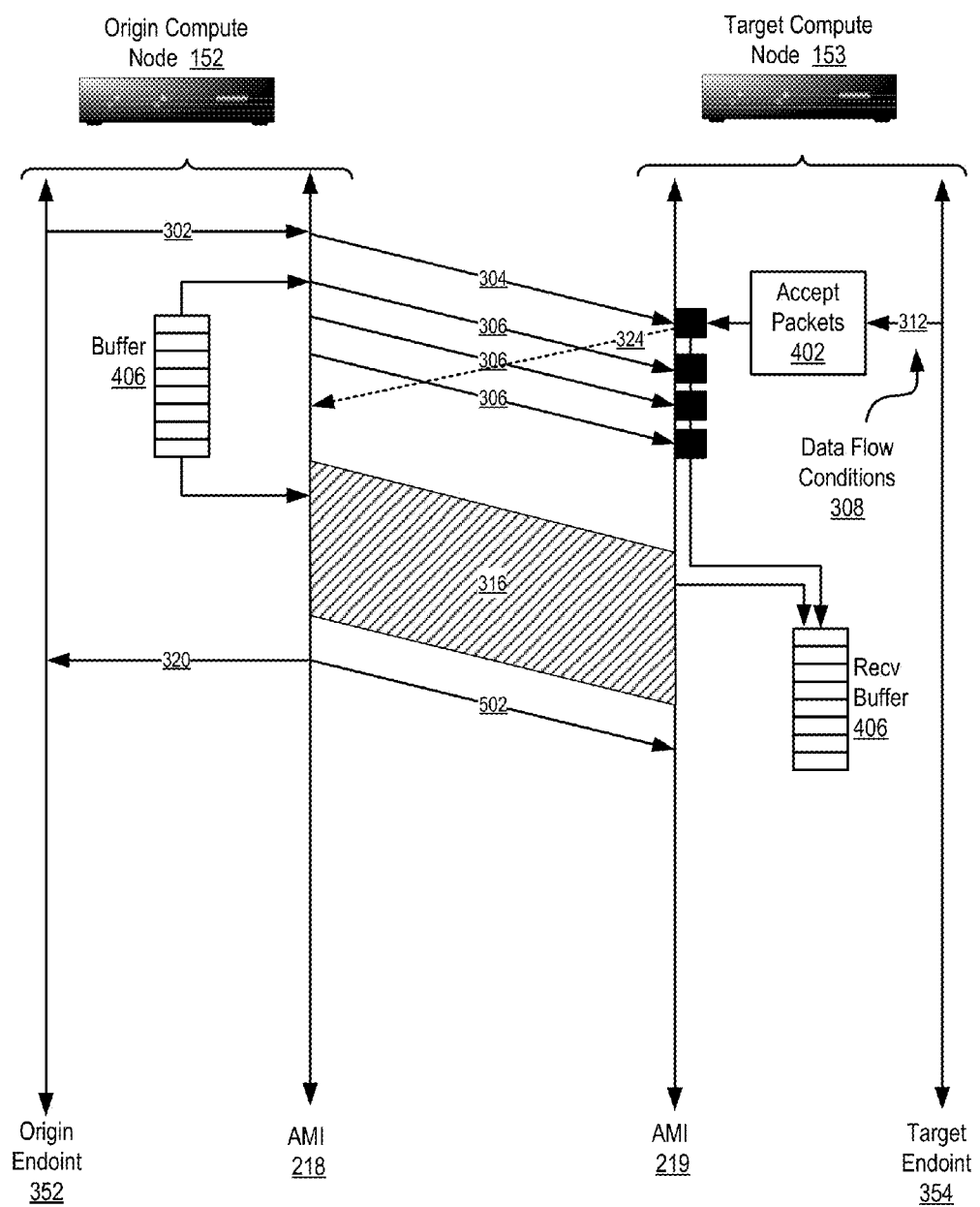
FIG. 5 sets forth a calling sequence diagram illustrating another example method of data communications in a distributed computing environment according to embodiments of the present invention.

For further explanation, FIG. 5 sets forth a calling sequence diagram illustrating another example method of data communications in a distributed computing environment according to embodiments of the present invention. The calling sequence diagram of FIG. 5 is similar to that of FIG. 3 in that the diagram of FIG. 5 depicts a similar distributed computing environment with a sender (152), receiver (153), AMIs (218, 219), and endpoints (352, 354). The example diagram of FIG. 5 is also similar to that of FIG. 3 in that the diagram of FIG. 5 includes: the sender (152) issuing, to the receiver (153), an eager SEND data communications instruction (304) to transfer SEND data; the sender (152) transmitting, to the receiver, the SEND data as eager data packets (306); the receiver (153) issuing a STOP instruction (324) to the sender (152); and the receiver (153) transferring SEND data by RDMA (316).

The diagram of FIG. 5 differs from that of FIG. 3, however, in that the receiver (153) initially accepts the eager data packets (306) transmitted from the sender before the sender receives the STOP instruction (324). Also, the STOP instruction (324), in the example of FIG. 5 may also include includes a designation of a receive buffer (504). Such a designation may include a location in memory, a size, and so on.

Knowing the amount of data already transmitted (and accepted) as eager data packets, the sender also knows the amount of data remaining to be transmitted. With the designation of the receive buffer (504) from the STOP instruction (324), the sender (152), rather than the receiver (153), transfers the SEND data that was not sent before the sender received the STOP instruction from the SEND buffer (406) into the receiver buffer (504) by RDMA. That is, the sender transfers by RDMA (such as DMA PUT operation) the SEND data not transmitted to the receiver in data eager packets prior to receiving the STOP instruction.

Figure 6:
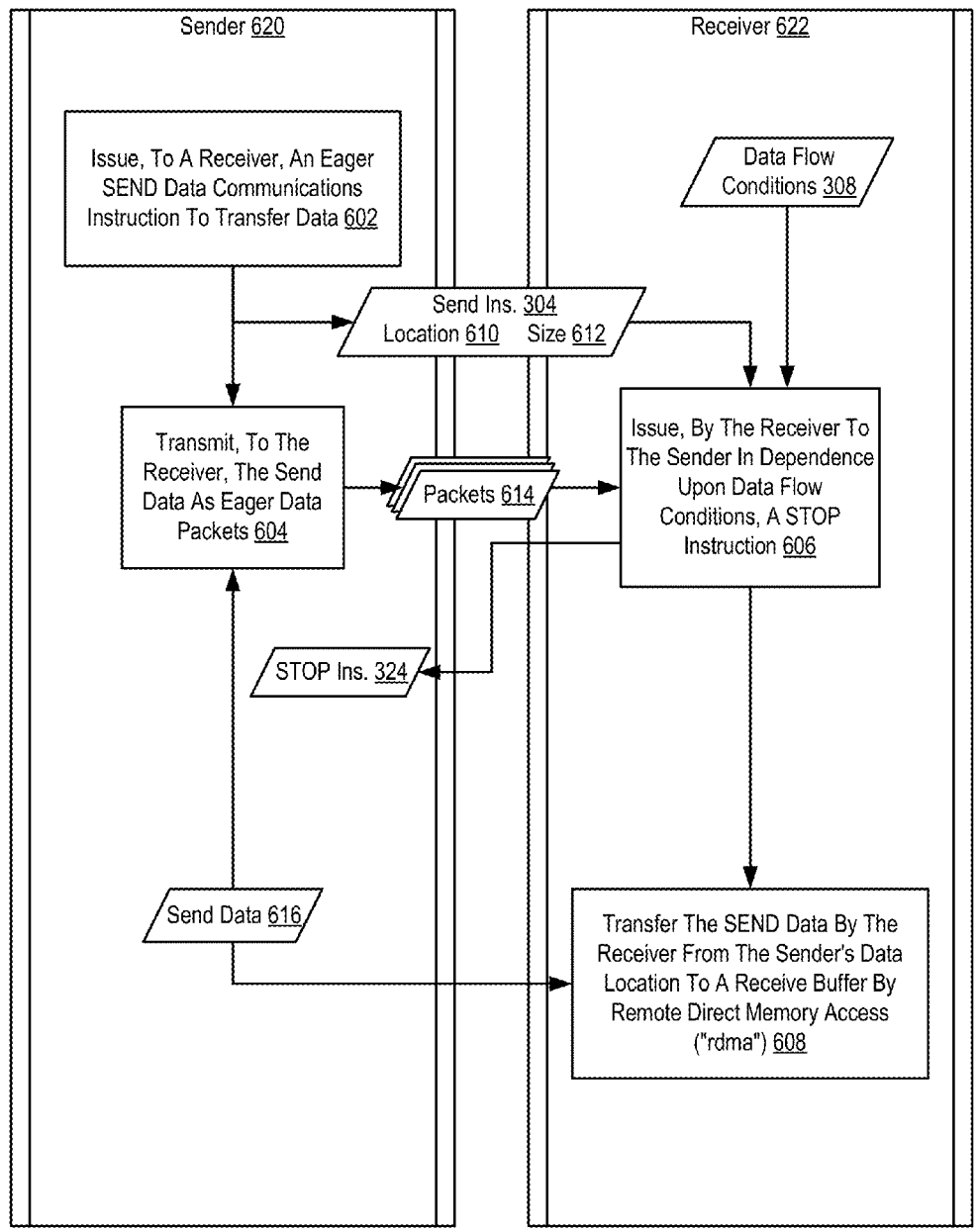
FIG. 6 sets forth a flow chart illustrating an example method of data communications in a distributed computing environment according to embodiments of the present invention.

FIG. 6 sets forth a flow chart illustrating an example method of data communications in a distributed computing environment according to embodiments of the present invention. The method of FIG. 6 may be carried out in a distributed computing environment similar to that depicted in the example of FIG. 1 which includes a plurality of computers coupled for data communications through communications adapters and an AMI.

The method of FIG. 6 includes issuing (602), by a sender (620) to a receiver (622), an eager SEND data communications instruction (304) to transfer SEND data (616). The instruction (304) includes information describing data location (610) at the sender and data size (612). Issuing (602) an eager SEND data communications instruction (304) to transfer SEND data (616) may be carried out responsive to an AMI of the sender (620) receiving, from an application, a call to a SEND function via an API exposed by the AMI. The AMI, responsive to the send call may send the instruction (304) via data communications adapters such as those set forth in the example of FIG. 1 and FIG. 2 in the manner described therein.

The method of FIG. 6 also includes transmitting (604), by the sender to the receiver, the SEND data (616) as eager data packets (614). Transmitting (604) the SEND data as eager data packets (614) may be carried out by the AMI of the sender (620) through data communications adapters. Such packets may be of equal size or of varying size.

The method of FIG. 6 also includes issuing (606), by the receiver to the sender in dependence upon data flow conditions (308), a STOP instruction. Issuing (606) a STOP instruction may be carried out by the receiver's (222) AMI, in one or more data communications packets sent to the sender's (620) AMI via one or more data communications adapters. The STOP instruction includes an order to stop transmitting the eager data packets. The sender (620), upon receipt of the STOP instruction ceases transmission of the SEND.

Issuing (606) the STOP instruction may be carried out with no utilization of an eager protocol limit. The eager protocol limit may include a data size above which a sender selects a rendezvous protocol instead of an eager protocol for transmission of data. Further, issuing (606) the STOP instruction may be carried out with no utilization of any flow control token or flow control accounting.

The method of FIG. 6 also includes transferring (508), by the receiver (522) from the sender's (520) data location (510) to a receive buffer by remote direct memory access ("RDMA"), the SEND data (516). Transferring (508) the SEND data may be carried out, in some embodiments, in dependence upon the data flow conditions (308). That is, transferring (508) the SEND data may be carried out responsive to a change in the data flow conditions after the SEND instruction is received. For example, a temporary receive buffer (at the receiver's adapter, in the AMI memory space, or in Application memory space) may become available. In another example, a RECEIVE instruction may be received by the receiver's AMI that corresponds to the SEND instruction issued by the sender.

Transferring (608) the SEND data (616) by RDMA may be carried out by the sender providing to a DMA engine in a DMA communications adapter at the sender, a transfer descriptor that indicates the data location (610) and the size (612) of the SEND data at the sender (620) followed by one or more GET DMA operations.

Figure 7:
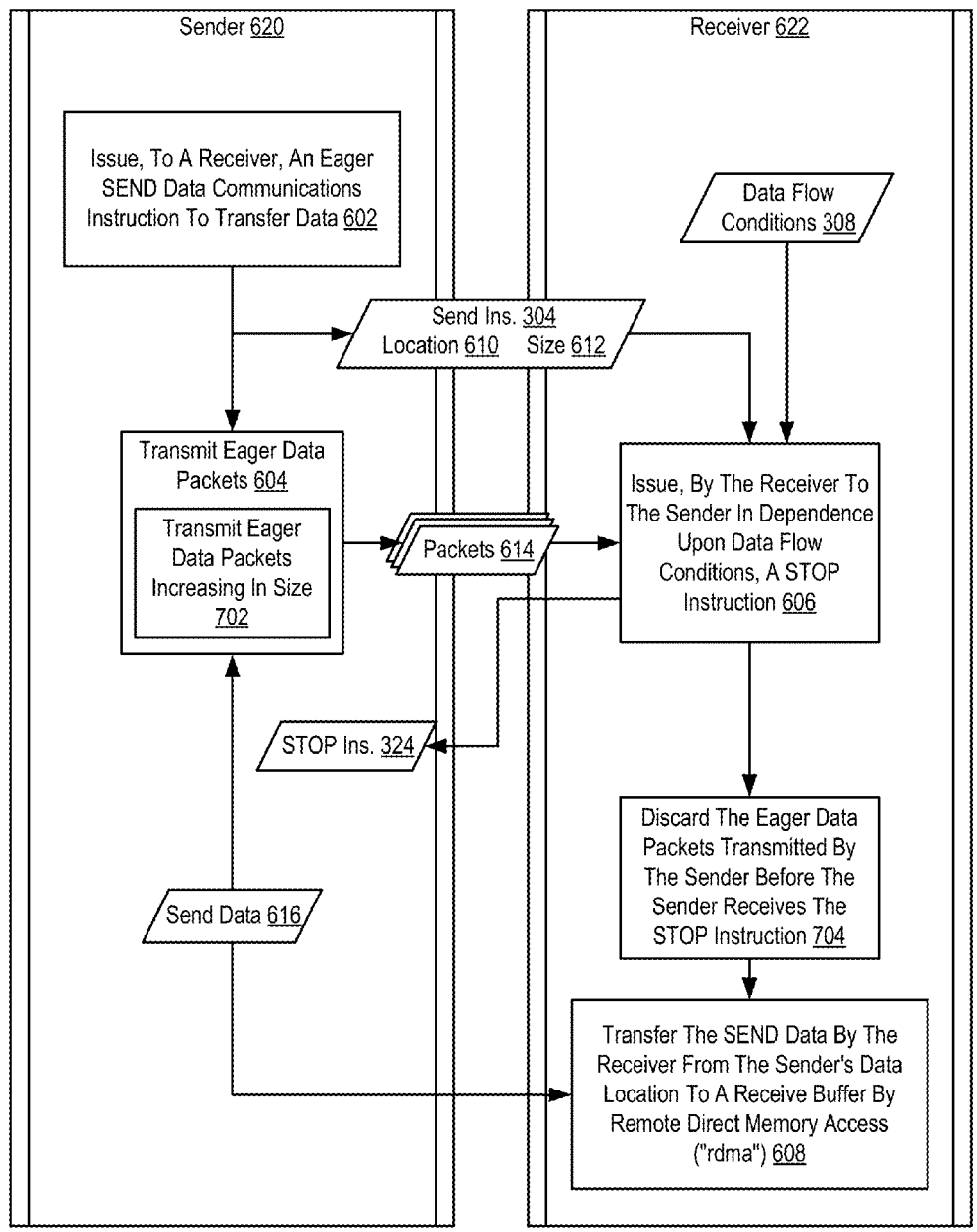
FIG. 7 sets forth a flow chart illustrating an example method of data communications in a distributed computing environment according to embodiments of the present invention.

For further explanation, FIG. 7 sets forth a flow chart illustrating an example method of data communications in a distributed computing environment according to embodiments of the present invention. The method of FIG. 7 is similar to the method of FIG. 6 in that the method of FIG. 7 is carried out in a similar distributed computing environment and the method of FIG. 7 includes: issuing (602), to a receiver, an eager SEND data communications instruction; transmitting (604), to the receiver, the SEND data as eager data packets; issuing (606), to the sender (620), a STOP instruction, and transferring (508) the SEND data by RDMA.

The method of FIG. 7 differs from the method of FIG. 6, however, in that transmitting (604) the SEND data from the sender to the receiver is carried out by transmitting (702) multiple eager data packets increasing in size. The method of FIG. 7, also includes discarding (704), by the receiver, the eager data packets transmitted by the sender before the sender receives the STOP instruction.

Figure 8:
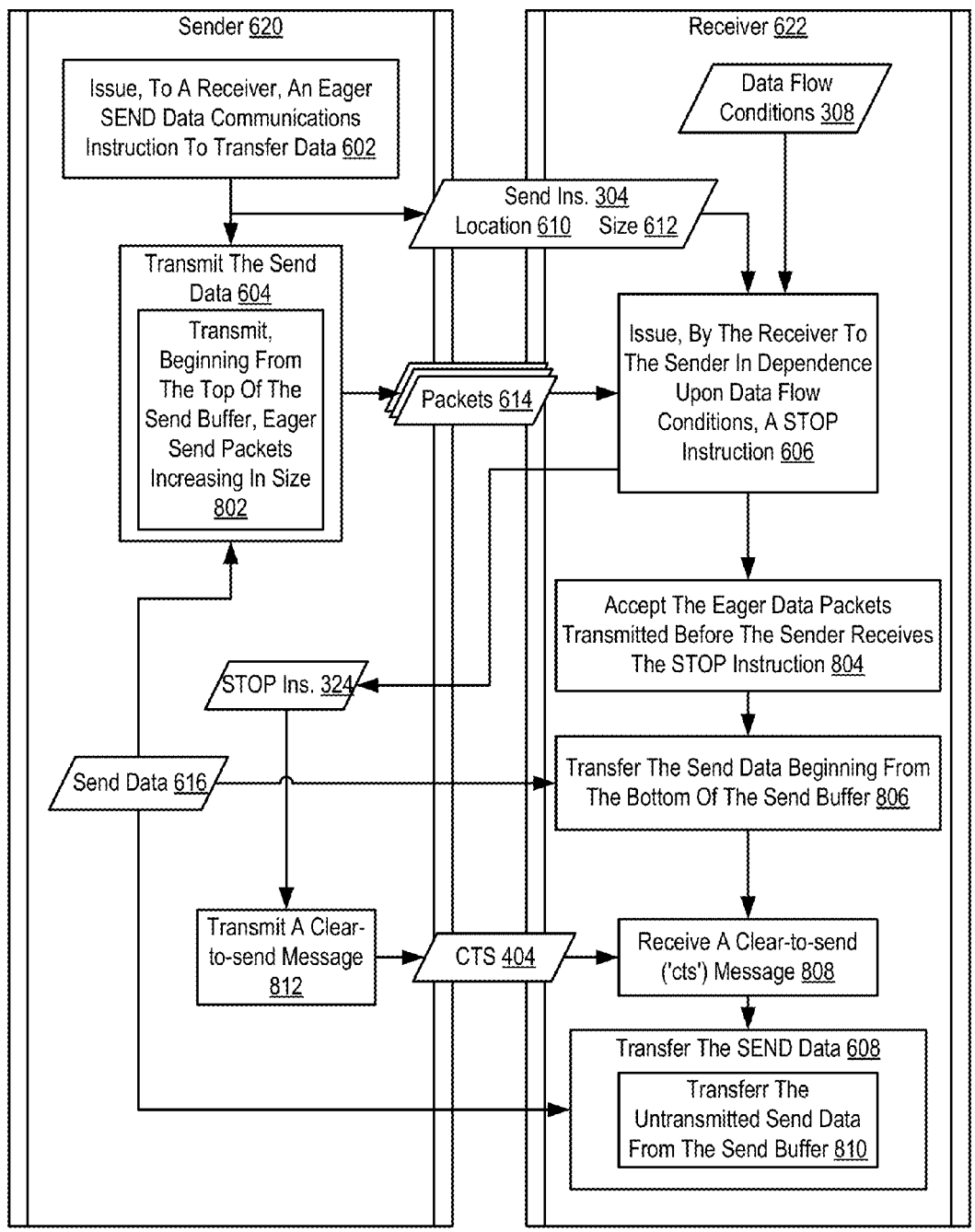
FIG. 8 sets forth a flow chart illustrating an example method of data communications in a distributed computing environment according to embodiments of the present invention.

For further explanation, FIG. 8 sets forth a flow chart illustrating an example method of data communications in a distributed computing environment according to embodiments of the present invention. The method of FIG. 8 is similar to the method of FIG. 6 in that the method of FIG. 8 is carried out in a similar distributed computing environment and the method of FIG. 8 includes: issuing (602), to a receiver, an eager SEND data communications instruction; transmitting (604), to the receiver, the SEND data as eager data packets; issuing (606), to the sender (620), a STOP instruction, and transferring (508) the SEND data by RDMA.

The method of FIG. 8 differs from the method of FIG. 6, however, in that transmitting (604) the SEND data from the sender to the receiver is carried out by transmitting (802), beginning from the top of the send buffer, the SEND data as multiple eager send packets increasing in size.

The method of FIG. 8 also includes accepting (804), by the receiver, the eager data packets transmitted from the sender before the sender receives the STOP instruction. Here, rather than discarding the data packets received from the sender prior to the sender receiving the STOP instruction as in the method of FIG. 8, the receiver actually accepts (804) the data packets.

Immediately and during the acceptance (804) of the data packets, the receiver in the method of FIG. 8 also begins transferring (806) the SEND data beginning from the bottom of the send buffer by RDMA. In this way, the receiver may transfer the SEND data from one end of the send buffer while the sender transmits SEND data as eager data packets from the opposite end of the buffer in parallel.

The sender, upon receiving the STOP instruction, ceases transmitting the eager data packets (614) and transmits a CTS message to the receiver. The CTS message (404) may include information advising the receiver of the quantity of eager SEND data transmitted before the sender received the STOP instruction. To that end, the method of FIG. 8 also includes receiving (808), by the receiver from the sender, the CTS message (404) and transferring (810) the untransmitted SEND data from the send buffer.

Figure 9:
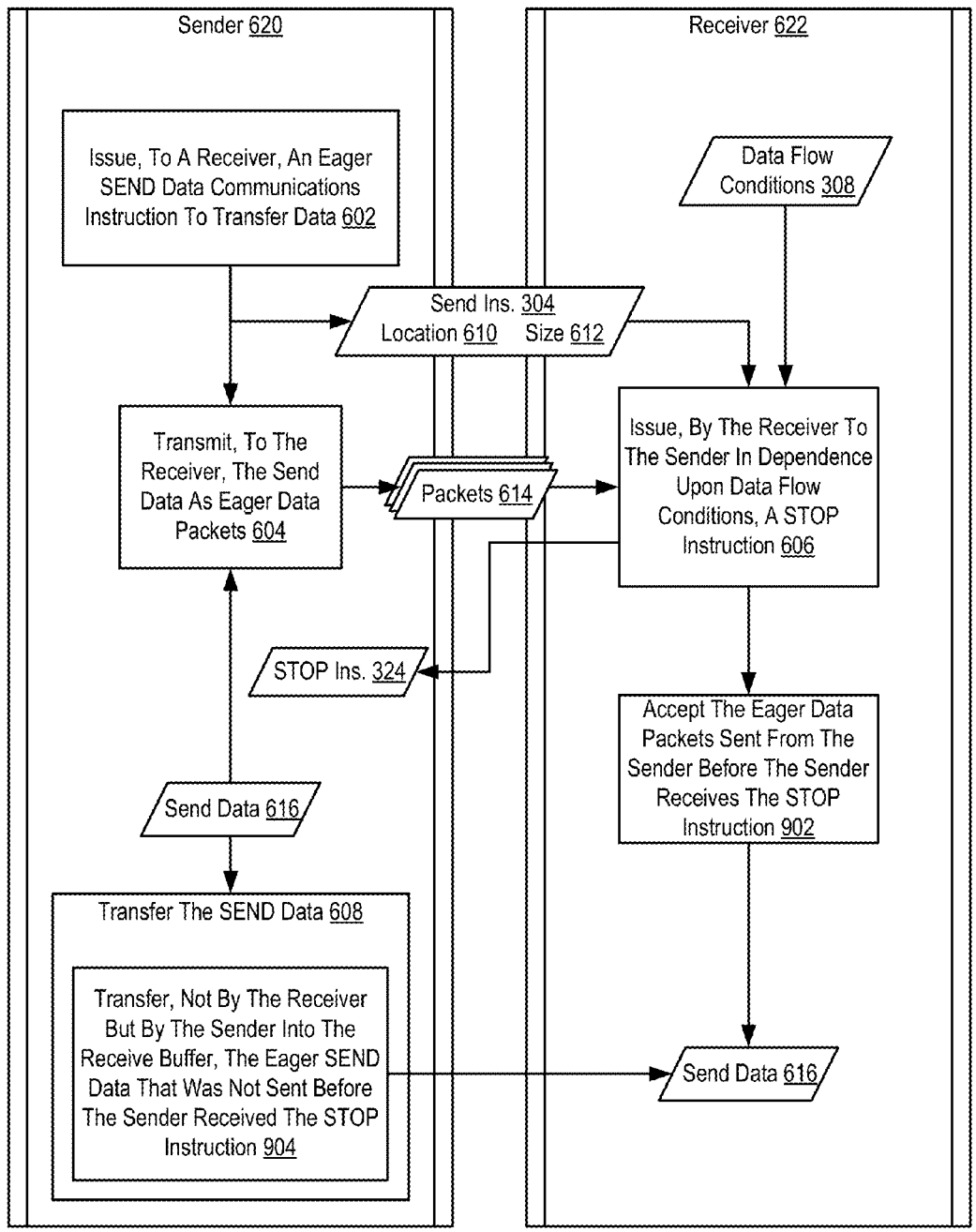
FIG. 9 sets forth a flow chart illustrating an example method of data communications in a distributed computing environment according to embodiments of the present invention.

For further explanation, FIG. 9 sets forth a flow chart illustrating an example method of data communications in a distributed computing environment according to embodiments of the present invention. The method of FIG. 9 is similar to the method of FIG. 6 in that the method of FIG. 9 is carried out in a similar distributed computing environment and the method of FIG. 9 includes: issuing (602), to a receiver, an eager SEND data communications instruction; transmitting (604), to the receiver, the SEND data as eager data packets; issuing (606), to the sender (620), a STOP instruction, and transferring (508) the SEND data by RDMA.

The method of FIG. 9 differs from the method of FIG. 6, however, in that the method of FIG. 9 includes accepting (902) by the receiver the eager data packets (614) sent from the sender before the sender receives the STOP instruction. The STOP instruction (324) in the example of FIG. 9 may also include a designation of a receive buffer. Such a designation may include a memory address of the receive buffer. To that end, the method of FIG. 9 continues by transferring (904), not by the receiver (622) but by the sender (620) via RDMA into the receive buffer, the SEND data (616) that was not sent before the sender received the STOP instruction. The sender (620) is aware of the quantity of SEND data transmitted as eager data packets (614) and thus is aware of the quantity of SEND data that was not transmitted prior to receiving the STOP instruction. As such, the sender (620) need no other information to transfer the remaining SEND data to the receive buffer other than the location of the receive buffer.

Example embodiments of the present invention are described largely in the context of fully functional computers that implements data communications in a distributed computing environment according to embodiments of the present invention. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data communications in a distributed computing environment, the distributed computing environment including a plurality of computers coupled for data communications through communications adapters and an active messaging interface ('AMI'), the method comprising:
    issuing, by a sender device to a receiver device, an eager SEND data communications instruction to transfer SEND data, the instruction including information describing a location and size of a send buffer in which the SEND data is stored;
    transmitting, by the sender device to the receiver device, the SEND data as eager data packets including transmitting, beginning from the top of the send buffer, the SEND data as multiple eager send packets;
    issuing, by the receiver device to the sender device in dependence upon data flow conditions, a STOP instruction, the STOP instruction comprising an order to stop transmitting the eager data packets;
    accepting, by the receiver device, the eager data packets transmitted from the sender device before the sender device receives the STOP instruction;
    transferring by the receiver device by remote direct memory access ("RDMA") the SEND data beginning from the bottom of the send buffer;
    ceasing, by the sender device upon receiving the STOP instruction, transmitting the eager data packets;
    receiving, by the receiver device from the sender device, a clear-to-send ('CTS') message advising the receiver device of the quantity of eager SEND data transmitted before the sender device received the STOP instruction; and
    transferring the untransmitted SEND data by the receiver device from the sender device's data location to a receive buffer by remote direct memory access ("RDMA") including based on the quantity of eager SEND data transmitted before the sender device received the STOP instruction as advised by the CTS message, transferring the untransmitted SEND data from the send buffer.

2. The method of claim 1 wherein:
    transmitting the SEND data from the sender device to the receiver device further comprises transmitting multiple eager data packets increasing in size.

3. The method of claim 1 wherein the data flow conditions comprise availability of temporary buffer space for the eager data packets.

4. The method of claim 1 wherein the data flow conditions comprise availability in the receiver of a RECEIVE instruction corresponding to the eager SEND instruction, the RECEIVE instruction including the memory location of a receive buffer.

5. The method of claim 1 wherein issuing the STOP instruction is carried out with no utilization of an eager protocol limit, the eager protocol limit comprising a data size above which a sender selects a rendezvous protocol instead of an eager protocol for transmission of data.

6. The method of claim 1 wherein issuing the STOP instruction is carried out with no utilization of any flow control token or flow control accounting.

7. An apparatus for data communications in a distributed computing environment, the distributed computing environment including a plurality of computers coupled for data communications through communications adapters and an active messaging interface ('AMI'), the computers comprising computer processors operatively coupled to computer memory having disposed within it computer program instructions that, when executed by the computer processors, cause the computers in the distributed computing environment to carry out the steps of:
    issuing, by a sender device to a receiver device, an eager SEND data communications instruction to transfer SEND data, the instruction including information describing a location and size of a send buffer in which the SEND data is stored;
    transmitting, by the sender device to the receiver device, the SEND data as eager data packets including transmitting, beginning from the top of the send buffer, the SEND data as multiple eager send packets;
    issuing, by the receiver device to the sender device in dependence upon data flow conditions, a STOP instruction, the STOP instruction comprising an order to stop transmitting the eager data packets;
    accepting, by the receiver device, the eager data packets transmitted from the sender device before the sender receives the STOP instruction;
    transferring by the receiver device by remote direct memory access ("RDMA") the SEND data beginning from the bottom of the send buffer;
    ceasing, by the sender device upon receiving the STOP instruction, transmitting the eager data packets;
    receiving, by the receiver device from the sender device, a clear-to-send ('CTS') message advising the receiver device of the quantity of eager SEND data transmitted before the sender device received the STOP instruction; and
    transferring the untransmitted SEND data by the receiver device from the sender device's data location to a receive buffer by remote direct memory access ("RDMA") including based on the quantity of eager SEND data transmitted before the sender device received the STOP instruction as advised by the CTS message, transferring the untransmitted SEND data from the send buffer.

8. The apparatus of claim 7 wherein:
    transmitting the SEND data from the sender device to the receiver device further comprises transmitting multiple eager data packets increasing in size.

9. The apparatus of claim 7 wherein the data flow conditions comprise availability of temporary buffer space for the eager data packets.

10. The apparatus of claim 7 wherein the data flow conditions comprise availability in the receiver of a RECEIVE instruction corresponding to the eager SEND instruction, the RECEIVE instruction including the memory location of a receive buffer.

11. The apparatus of claim 7 issuing the STOP instruction is carried out with no utilization of an eager protocol limit, the eager protocol limit comprising a data size above which a sender selects a rendezvous protocol instead of an eager protocol for transmission of data.

12. The apparatus of claim 7 issuing the STOP instruction is carried out with no utilization of any flow control token or flow control accounting.

13. A computer program product for data communications in a distributed computing environment, the distributed computing environment including a plurality of computers coupled for data communications through communications adapters and an active messaging interface ('AMI'), the computer program product disposed upon a non-transitory computer readable storage medium, the computer program product comprising computer program instructions that, when installed and executed, cause the parallel computer to carry out the steps of:

issuing, by a sender device to a receiver device, an eager SEND data communications instruction to transfer SEND data, the instruction including information describing a location and size of a send buffer in which the SEND data is stored;

transmitting, by the sender device to the receiver device, the SEND data as eager data packets including transmitting, beginning from the top of the send buffer, the SEND data as multiple eager send packets;

issuing, by the receiver device to the sender device in dependence upon data flow conditions, a STOP instruction, the STOP instruction comprising an order to stop transmitting the eager data packets;

accepting, by the receiver device, the eager data packets transmitted from the sender device before the sender device receives the STOP instruction;

transferring by the receiver device by remote direct memory access ("RDMA") the SEND data beginning from the bottom of the send buffer;

ceasing, by the sender device upon receiving the STOP instruction, transmitting the eager data packets;

receiving, by the receiver device from the sender device, a clear-to-send ('CTS') message advising the receiver device of the quantity of eager SEND data transmitted before the sender device received the STOP instruction; and transferring the untransmitted SEND data by the receiver device from the sender device's data location to a receive buffer by remote direct memory access ("RDMA") including based on the quantity of eager SEND data transmitted before the sender device received the STOP instruction as advised by the CTS message, transferring the untransmitted SEND data from the send buffer.

14. The computer program product of claim 13 wherein:
transmitting the SEND data from the sender device to the receiver device further comprises transmitting multiple eager data packets increasing in size.

* * * * *